United States Patent [19]

Garman

[11] Patent Number: 5,669,086
[45] Date of Patent: Sep. 23, 1997

[54] INFLATABLE MEDICAL LIFTING DEVICES

[75] Inventor: David Edmund Talbot Garman, Llandrindod Wells, United Kingdom

[73] Assignee: Mangar International Limited, United Kingdom

[21] Appl. No.: 498,982

[22] Filed: Jul. 6, 1995

[30] Foreign Application Priority Data

Jul. 9, 1994 [GB] United Kingdom ............... 9413882
Feb. 17, 1995 [GB] United Kingdom ............... 9503129

[51] Int. Cl.$^6$ .................. A61G 7/10; A61G 7/14
[52] U.S. Cl. .............. 5/86.1; 5/81.1 R; 254/93 HP; 254/423; 280/304.1; 280/250.1; 297/DIG. 4
[58] Field of Search .................. 5/81.1 R, 83.1, 5/85.1; 254/93 HP, 423; 414/921; 280/304.1, 250.1; 297/DIG. 4

[56] References Cited

U.S. PATENT DOCUMENTS

| | | | |
|---|---|---|---|
| 3,123,400 | 3/1964 | Paulson | 297/314 |
| 4,688,760 | 8/1987 | Garman et al. | 254/93 HP |
| 4,786,032 | 11/1988 | Garman et al. | 254/93 HP |
| 4,993,736 | 2/1991 | Garman et al. | 280/304.1 |
| 5,441,237 | 8/1995 | Sweeney | 254/93 HP |

FOREIGN PATENT DOCUMENTS

| | | |
|---|---|---|
| 0 181 708 A1 | 5/1986 | European Pat. Off. |
| 0267542 | 5/1988 | European Pat. Off. |
| 0 342 076 A1 | 11/1989 | European Pat. Off. |
| 0 361 774 A1 | 4/1990 | European Pat. Off. |
| 31 40 014 A1 | 4/1983 | Germany. |
| 2097250 | 11/1982 | United Kingdom. |
| 2110527 | 6/1983 | United Kingdom. |
| 2166415 | 5/1986 | United Kingdom. |
| 2225558 | 6/1990 | United Kingdom. |
| 2 261 605 | 5/1993 | United Kingdom. |

*Primary Examiner*—Alexander Grosz
*Attorney, Agent, or Firm*—Neil F. Markva

[57] ABSTRACT

Mobile medical lifting apparatus comprising a mobile support means having wheels, castors or rollers, which mobile support means supports or provides a mounting for a lifting device comprising a stack of inflatable bags for raising a seat or platform supported by the lifting device, an inflatable bag at the bottom of the lifting device is actuable to raise the wheels, castors or rollers off the ground to enable the wheels, castors or rollers and, optionally, associated parts of the mobile support means, to be removed so that the lifting device can lower the seat or platform to very close to the ground to minimize the effort required to move a fallen person onto the platform.

20 Claims, 7 Drawing Sheets

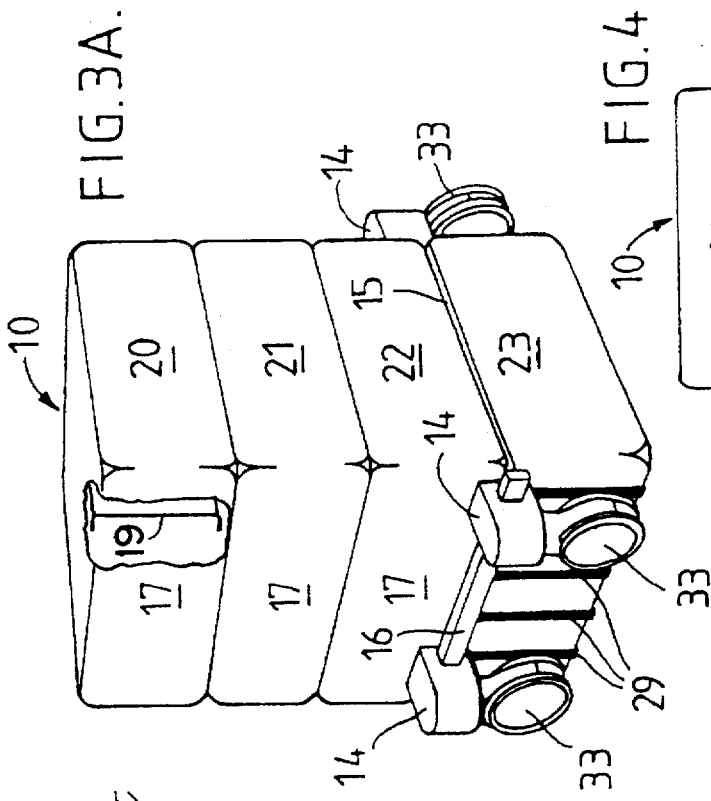
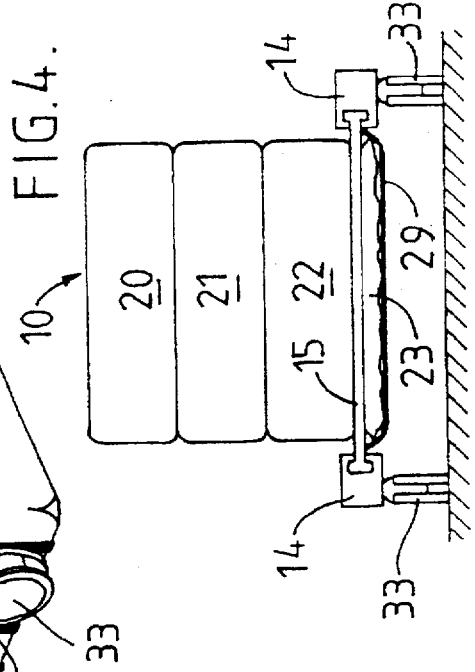
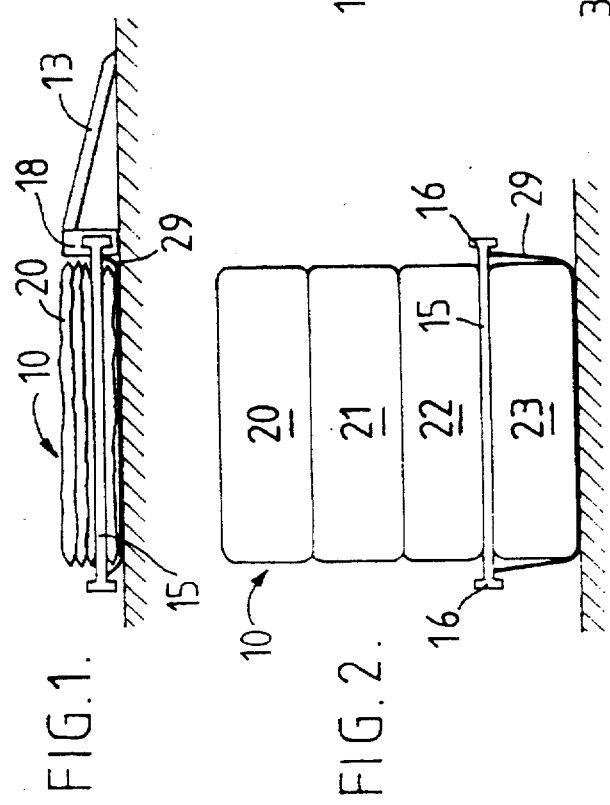
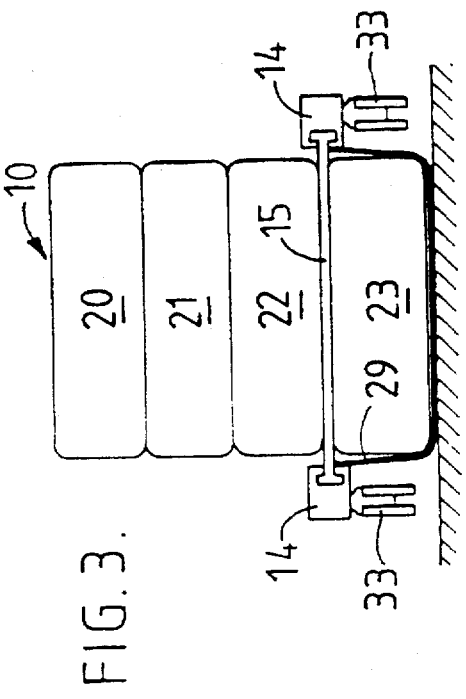

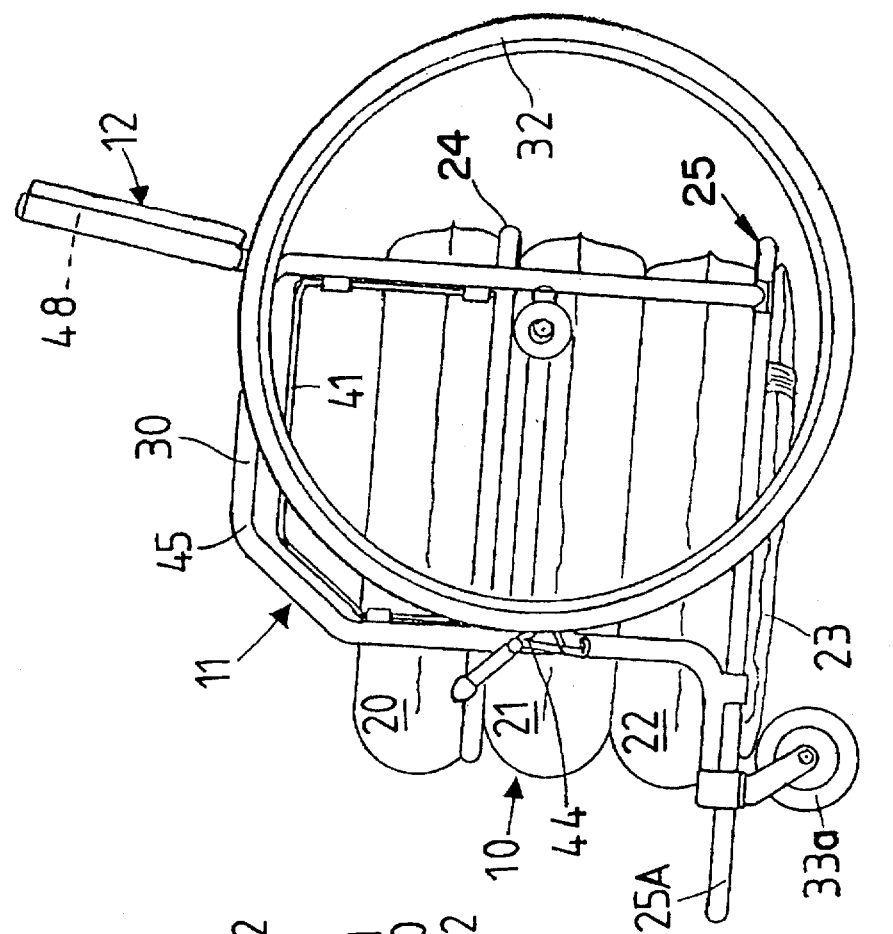
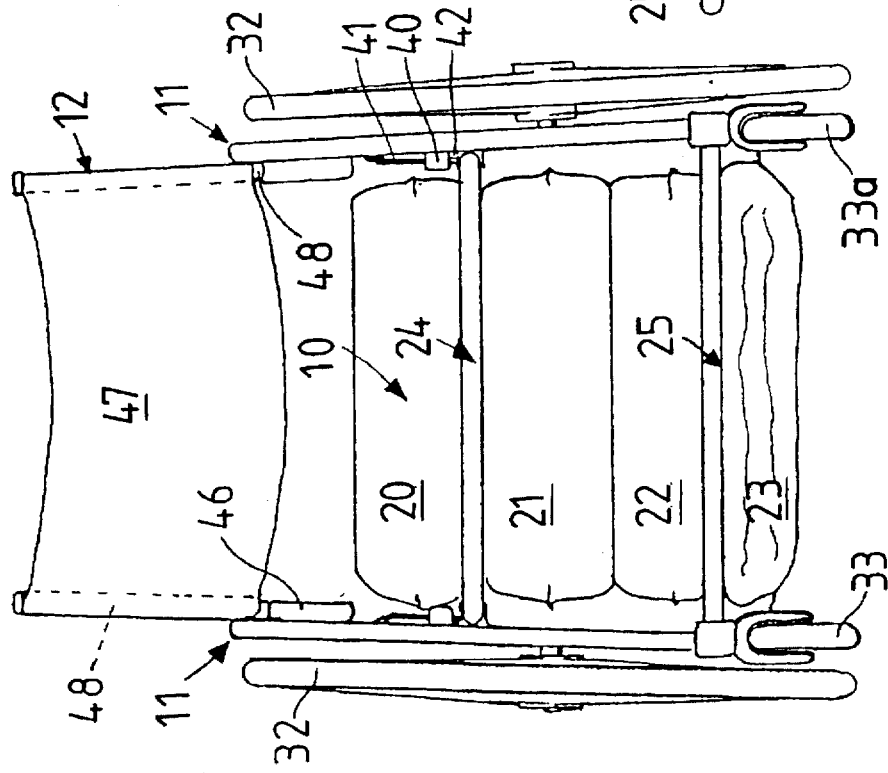

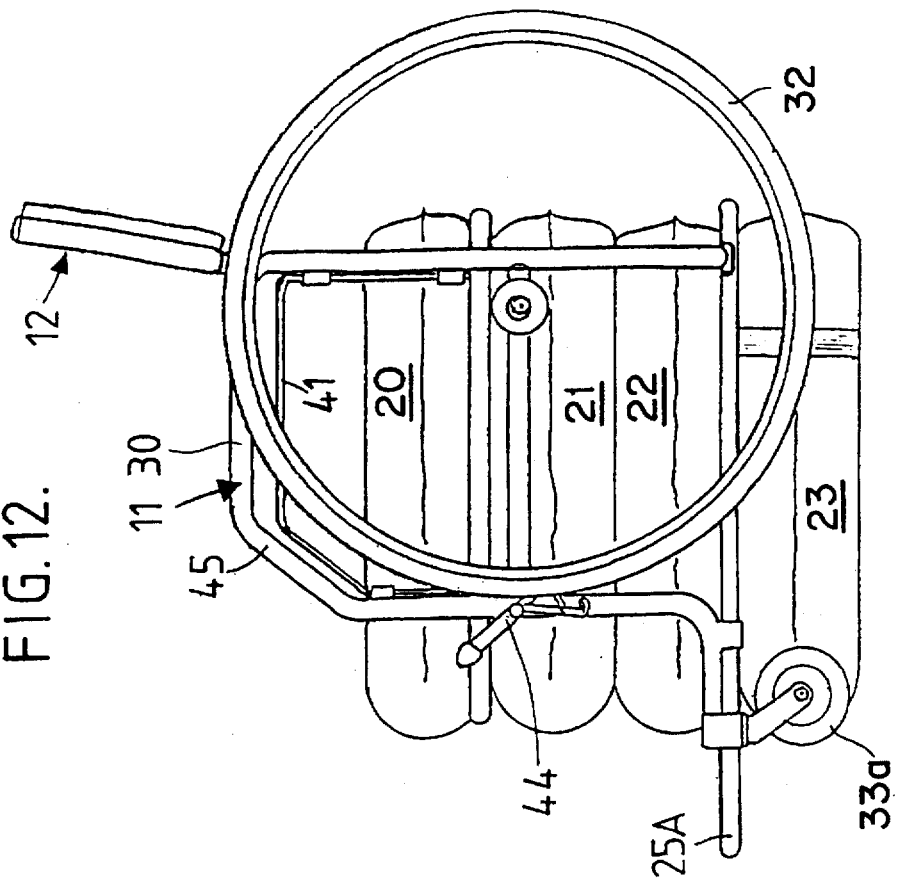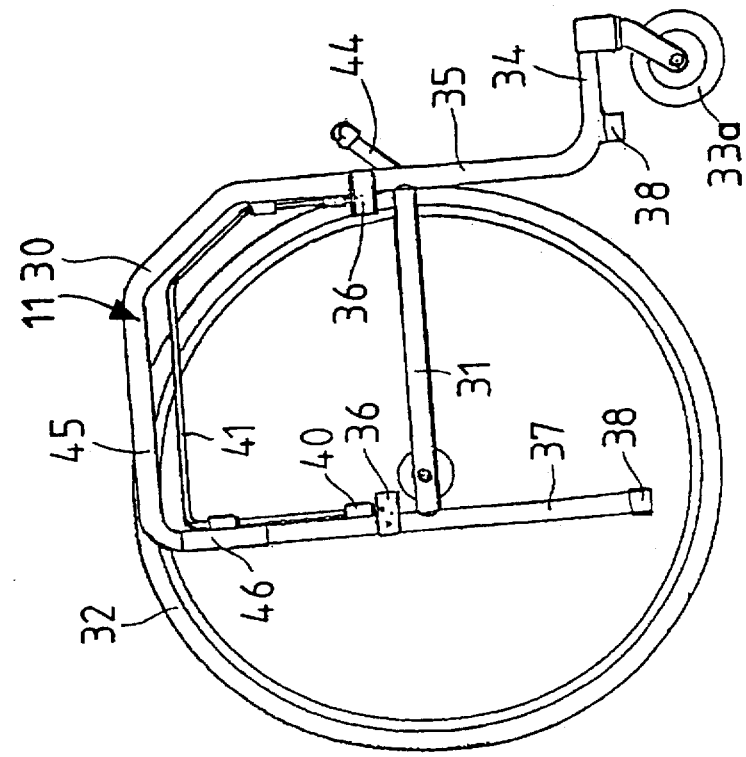

INFLATABLE MEDICAL LIFTING DEVICES

FIELD OF THE INVENTION

This invention concerns medical lifting devices and mobile apparatus for lifting injured or disabled persons in confined spaces.

BACKGROUND OF THE INVENTION

For emergency use, it is known to employ stretchers comprising a pneumatically inflatable mattress slung between poles. Such apparatus is bulky because of its length, and the maximum thickness of the mattress is very small and thus provides insufficient lift, so that the stretcher has to be raised manually by means of the poles which hinder movement and maneuvering in confined spaces.

It is also known to employ a large inflatable bag for lifting purposes. Such bags are inherently unstable during lifting, and are not therefore suitable for use in lifting and moving disabled persons.

Maneuverability is most important where lifting and movement of disabled persons are concerned, and in particular in circumstances where only one or two helpers or attendants are available to assist such a person.

Forms of apparatus such as hoists, employing large mobile frameworks and requiring operators to continuously operate complex controls, are not suitable for use in confined spaces, and in spite of having castors or wheels are inconvenient to operate under emergency conditions because of their weight, bulk and complexity.

SUMMARY OF THE INVENTION

In order to enable a fallen person to be lifted initially from the floor (for subsequent sideways transfer onto a wheelchair or trolley) we have made a medical lifting device comprising a stack of inflatable bags secured together, in which the fully inflated thickness of each bag is less than the width and breadth of each bag, at least the bag or bags below the uppermost bag of the stack containing internal flexible links to limit the inflated thickness thereof; which lifting device is hereinafter called "a lifting device of the kind described". However, this lifting device of the kind described is static, and is useful where space is available for wheelchair access alongside the lifting device.

We also make a mobile apparatus in which a wheeled chassis provides a frame on which a lifting device of the kind described is mounted to support a seat or platform on which a person can sit, recline or lie. However, even with the lifting device completely deflated a fallen person has to be lifted to some considerable height from the ground up onto the seat or platform, before the apparatus can be employed to move the person. Such lifting requires manual effort or the use of other lifting gear where space admits such gear.

The problems of effort required to lift a person in a confined space, and the problem caused by the weight and bulk of the known apparatus remain, and an object of the invention is to enable such problems to be reduced or avoided.

In order to enable said problems to be reduced or avoided, according to the present invention there is provided mobile medical apparatus comprising a lifting device of the kind described, and characterized in that:

(a) the stack is supportable or is supported upon a mounting arrangement on or connectable to mobile support means provided with wheels; and (b) a base lifting bag assembly is provided below said stack and is inflatable to raise the stack to a height sufficient to enable at least the wheels to be relocated on, removed from or fitted to the apparatus.

The stack may be releasably mounted on or secured to the mounting.

In a simple embodiment of the invention the apparatus includes a lifting device of the kind described and is characterized in that the lowermost bag of the stack is mounted on a rigid base provided with detachable wheels or rollers, and in that a base lifting bag assembly is provided below said base and is inflatable to raise the base to a height sufficient to enable the wheels, castors or rollers to be lifted off the floor on which the lifting device is disposed.

In a preferred embodiment of the invention the apparatus comprises a lifting device of the kind described and is characterized in that it further comprises a mounting releasably engageable with said stack when inflated; wheel means on said mounting, and base lifting bag means disposed below said stack and actuable firstly to raise said stack to a height to enable said mounting to be engaged with the stack and secondly to retract upwards clear of the floor on which the wheel means rests.

In further forms of the invention the apparatus comprises a frame having wheel means e.g. wheels, castors or rollers, which frame provides a mounting for a lifting device of the kind described for raising a seat or platform supported by the lifting device, which apparatus is characterized in that the lifting device is actuable to raise the wheels, castors or rollers off the ground so that the wheels, castors or rollers, and, optionally, associated parts of the frame, to be removed so that the lifting device can lower the seat or platform to very close to the ground to minimize the effort required to move a fallen person onto the platform.

The inflated thickness of the lowermost bag of the stack is preferably greater than, e.g. about double, the inflated thickness of the uppermost bag, but the bags may be of any combination of thicknesses to achieve a desired resultant lift. The bags may be made from a drop thread material which integrally incorporates the links, but preferably the links are webs of flexible material extending between and bonded to the upper and lower panels of the bags. The stack preferably comprises three or four bags.

Adjacent bags in the stack are preferably secured together by webs which extend along at least two sides thereof and are bonded to side walls of the bags.

The base-lifting bag assembly may comprise more than one bag, and may have an abrasion resistant underside or undercovering.

Hoses or pipes are preferably releasably attached to inlets of the bags, which inlets may be arranged on one side of the stack and may be offset from one another to reduce the overall height or thickness of the device when the bags are deflated.

The overall plan dimensions of the stack are preferably at least 0.3 meters by 0.8 meters up to 0.8 meters by 2.0 meters.

The fully inflated height of each bag is preferably less than half of its smallest plan dimension, e.g. about a third or a quarter.

The mounting or base preferably comprises lateral portions, e.g. flanged lateral portions, from which the castors can be removed, e.g. by being moved longitudinally of said portions.

The mounting or base preferably has releasably attached thereto a ramp panel or device which provides a ramp to facilitate the device being inserted beneath a person or a person being moved onto the device. The ramp panel or device may have a keyway at one end to engage and receive one of the flanged lateral portions.

The upper surface of the stack may be provided by a stiff or hard panel, to facilitate transfer of a person onto or off said surface.

The lifting device is light, is thin when deflated for ease of insertion under a person, gives substantial stability during sequential inflation, is stable when fully inflated, is relatively inexpensive to construct, and is easy to maneuver on its wheels, castors or rollers when the stack is inflated and supports a person.

More particularly there is provided, according to the present invention, mobile lifting apparatus comprising a lifting device of the kind described supported on a frame, which apparatus is characterized in that the frame comprises two lateral frame units on which wheels, castors or rollers are mounted, which units are individually separable from the lifting device; and in that the lifting device comprises a stack of pneumatically inflatable bags, and base lifting bag means, which comprises a jacking bag located below said stack or is the lowermost bag of the stack, and is attached to a mounting arrangement to which the lateral frame units are releasably attached, said base lifting bag means being inflatable to raise the wheels, castors or rollers of the frame units from the ground.

In use, the lifting device and base lifting bag means are inserted in a deflated condition between a person and the ground and are then inflated, before the wheels, castors, rollers or frame units are attached to the mounting at each side of the lifting device while the whole apparatus is supported by the inflated base lifting bag means; and thereafter the base lifting bag means is deflated to retract upwardly towards the mounting arrangement so as to lower the wheels, castors or roller into effective contact with the ground so that the apparatus becomes mobile.

The two frame units may be connected at the rear of the apparatus by bridging means such as a separable backrest, bridge member or handle member.

The mounting arrangement preferably comprises a lower mounting at the junction of the jacking or lowermost bag with the next above bag, and an upper mounting at the junction of the uppermost bag with the bag immediately therebelow, and each frame unit preferably includes upper and lower connector means to engage the upper and lower mountings.

At least the upper mounting preferably comprises a rigid peripheral frame and a web or webs extending across the frame and between the bags, but the frame could be attached to the stack of bags by other means, e.g. webs of material bonded to the flanks of the bags to partially encircle portions of the frame.

The plan areas of the frames allow one to be disposed between the other and the stack when the bars are deflated so that the apparatus minmizes the amount of lifting required to transfer the lifting device to beneath a person.

At least the upper mounting preferably comprises a rigid peripheral frame and a web or webs extending across the frame and between the bags, but the frame could be attached to the stack of bags by other means, e.g. webs of material bonded to the flanks of the bags to partially encircle portions of the frame.

The lower mounting may be in the form of a base to which rollers or castors may be attached or attachable for use, e.g. in very confined spaces where there is insufficient room to fit the frame units.

The lifting device may include a backrest or headrest, which is preferably constructed to be laid flat to serve as an extension of the deflated lifting device.

The frame units preferably each provide an armrest or side rail for the apparatus.

The invention more particularly provides a wheelchair comprising a wheeled chassis and a seat lifting device, wherein said lifting device comprises a stack of inflatable bags; wherein the wheeled chassis comprises rigid upper and lower mountings attached to said stack, and two lateral frame units individually and separably attached to the mountings; and wherein the lowermost bag of the stack is deflatable to lower said wheels onto the ground.

Generally the invention provides mobile apparatus comprising a lifting device of the kind described mounted on mobile support means providing a mounting and wheel means disposed on the mounting outside the plan area of the lifting device, wherein the wheels are, with or without the mounting or parts thereof, removable to permit clear access to the lifting device when the latter is deflated, and wherein an inflatable base or under bag is provided to support the lifting device while the wheels are refitted which base or under bag is deflatable to rise clear above the bottom level of the wheel means.

The lifting device and underbag are preferably collapsible to have a small overall height e.g. of 10 cm or less, preferably about 4 to 6 cm or less.

The inflation and deflation of the bags is preferably controlled by electro-pneumatic control means, which preferably comprises a plurality of solenoid actuated flow control valves and a hand control unit for remote electrical actuation of the valves to control the flow of compressed air from a compressor or pump to the bags via the valves and to control the release of air from the bags.

Optionally, the control means may enable air to be pumped from the base lifting bag means or assembly to cause the bag or bags of the assembly to retract upwardly to the underside of the stack or the mounting; but alternatively or additionally the device may include retractor means, such as an elastic undercovering, elastic cords or elastic mesh secured to the base and across the bag to pull the bag or bags upwards.

In respect of the bags of the stack, the control means may include a plurality of pressure actuated switching arrangements, arranged so that each valve is connected to a respective one of the switching arrangements so that the valve is closed by the switching arrangement when the pressure at that output reaches a predetermined pressure, and so that the switching arrangements are electrically connected to open the valves sequentially to 8 pneumatic pressure supply line, for automatically inflating the bags sequentially.

Parts of the control means for inflating the bags of the stack may be incorporated in a pressure sensitive control unit which is arranged to receive a single compressed air supply supply and to distribute the compressed air sequentially to a plurality of air outlets so that each outlet, starting with a predetermined one thereof, is supplied with compressed air until a predetermined pressure is reached and is then isolated from the supply before the next outlet commences to receive compressed air.

The control means may also include or be combined into a portable compressed air supply unit which includes a compressor to provide a compressed air supply, and, optionally, a rechargeable battery to power the compressor and power a remote electrical hand-control unit and valve solenoids.

The air supply unit may include a switch to switch off the compressor when all outlets serving the bags in the stack have reached a predetermined pressure or respectively predetermined pressures.

BRIEF DESCRIPTION OF THE DRAWINGS

The invention will be described further by way of example, with reference to the accompanying diagrammatic drawings, wherein:

FIG. 1 shows a lifting device of apparatus of the invention in side elevation with a ramp device attached, but with pipes and connections omitted;

FIG. 2 shows the lifting device in a fully inflated condition, with ramp device detached;

FIG. 3 shows an embodiment of apparatus of the invention in which the lifting device has castors fitted;

FIG. 3A is a perspective view of the apparatus;

FIG. 4 shows the apparatus, with a stack of bags inflated and a base lifting means deflated, in a mobile condition;

FIGS. 6 and 7 show a second embodiment of apparatus of the invention, in the form of a wheelchair, in rear and side elevation respectively;

FIG. 10 shows a side frame unit of a wheeled frame of the wheelchair in side elevation;

FIG. 12 shows the wheelchair with the lifting device in a fully inflated condition with the wheels of the frame lifted clear of the ground.

DETAILED DESCRIPTION

Figure 5:
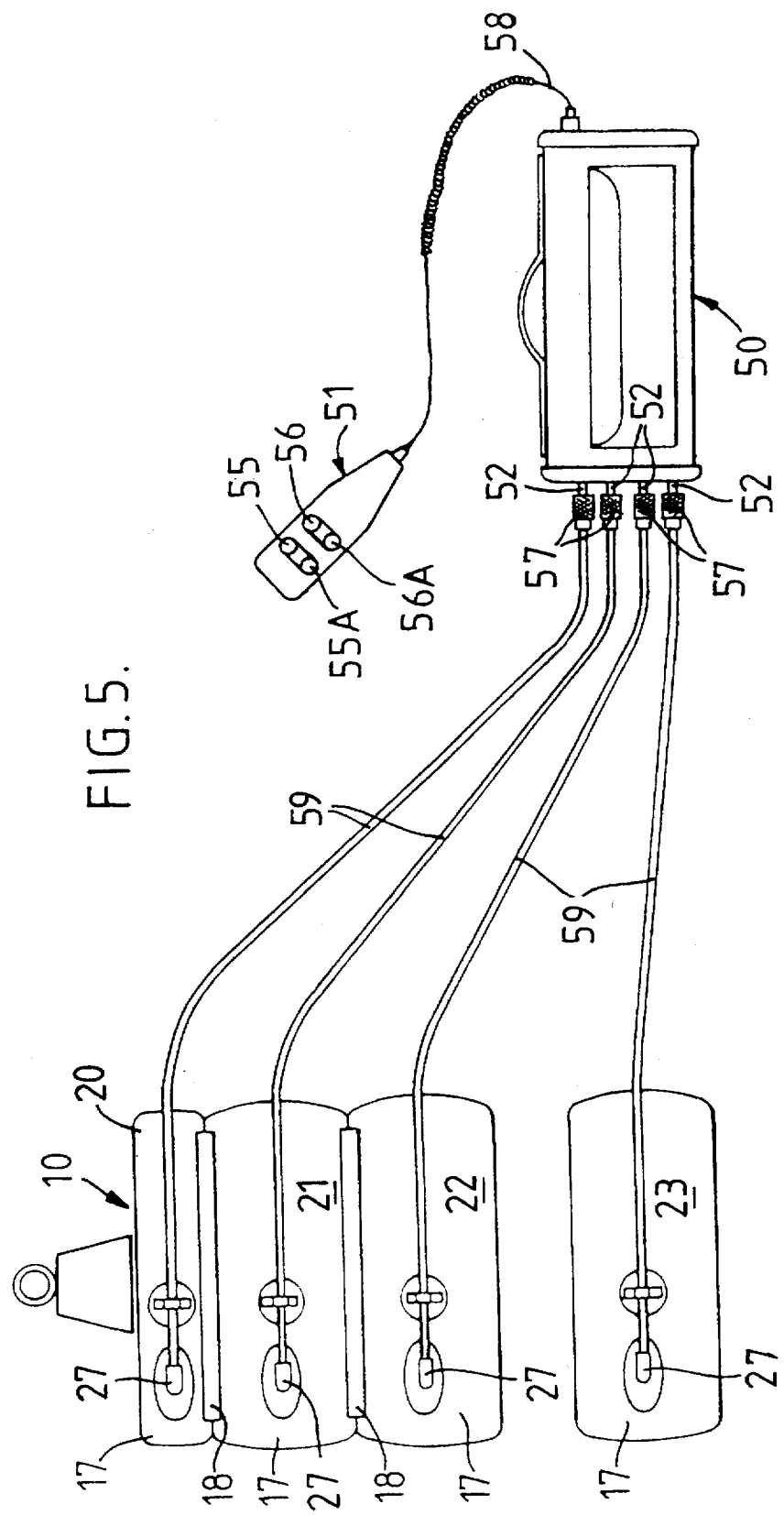
FIG. 5 shows the bags of the lifting device and the base lifting means together with pneumatic control means, a hand operated remote control unit and the pipes for inflating the bags.

In the first embodiment (FIGS. 1 to 5) the apparatus comprises a lifting device 10 which includes a stack of three bags 20, 21 and 22, each of which is about 0.125 meters thick, 0.4 meters in width, and about 0.35 meters in breadth. However, the top bag 20 may have an inflated thickness of about 0.1 meters, whereas the bags 21 and 22 therebelow may be about 0.2 meters thick, as shown in FIG. 5.

The stack of bags is secured upon a mounting in the form of a rigid base 15, which has flanged lateral marginal portions 16 of T-shaped cross-section.

Base lifting means in the form of a bag 23 is held to the underside of the base 15 by retractor means comprising several elastic cords 29 which are secured to the base and extend across and below the bag 23 (FIG. 3A).

The apparatus further includes a set of four castor wheels 33 and a ramp device 13 which are releasably attachable to the base. Each castor has a head 14 in which is formed a recess shaped to accept the marginal portion 16 so that head 14 can be thrust onto and off and slid along said portion 16. An adjustable friction member (not shown) may be provided in the head 14 to enable the resistance to such sliding movement to be varied or pre-set. The ramp device 13 has an elongate head 18 which has a similarly shaped recess therein to enable the device 13 to be slid onto and off the marginal portion 16.

The rigid base 15 and the castor wheels 33 together constitute mobile support means for supporting and conveying the device 10.

Each bag comprises a body of drop thread material in which upper and lower panels are linked internally by a multiplicity of inelastic threads, and the panels are connected peripherally by flexible inelastic side walls 17 bonded to said panels. The panels and side walls are preferably made of woven fabric/reinforced plastics material, e.g. nylon reinforced butyl rubber material.

Webs 18 (shown in FIG. 5) are bonded to the side walls 17 along junctions at at least two sides of the stack between adjacent bags, to secure the bags together.

Each bag is provided with a pipe or hose 59 (FIG. 5) secured at an inlet 27 to the bag, and each hose has a terminal connector 57. The inlets 27 may be horizontally offset or laterally spaced from each other, at one end of the stack. Device 10 is arranged so that, in the fully deflated condition, the thickness of the stack is not much more than the thickness of a single hose e.g. is of the order of one or two centimeters, so that it projects only marginally above the base, and can be slid below a person who has to be lifted possibly in a confined space, e.g. in a bath, in a toilet compartment or between a bed and a wall. If space permits, the ramp device may be attached to the base to facilitate the movement of a person onto the device or the insertion of the device under a person.

Thereafter, and optionally before or after removal of the ramp device, all the bags can be inflated sequentially preferably starting with the bag 23 to maximum thickness to raise the person, as hereinafter described.

The lifting device 10 is powered by pneumatic supply and control unit 50 (FIG. 5) which can be manually actuated from a remote control unit 51.

The unit 50 provides four outlets 52. The outlets are connected to respective solenoid controlled valves each connected to the common compressed air supply from a compressor in the unit 50 driven by a motor in the unit 50, which unit also houses a rechargeable battery.

The remote control unit 51 provides two pairs of switches 55, 55A and 56, 56A each pair having a normal "off" position and an "up" switching position 55, 56 or a "down" switching position 55A, 56A respectively; and is releasably connected to the unit 50 by a lead 58.

The unit 50 contains circuitry which is arranged so that the bags of the stack can be inflated sequentially starting with bag 22 and deflated in the reverse sequence. When the switch 55 is initially moved to and held in its "up" position the motor is energized for inflating bag 22 and a valve is opened via relays in the circuitry.

When air bag 22 reaches its predetermined pressure, a pressure switch of the circuitry closes to actuate relays to close the valve for bag 22 and to open a valve for inflating the bag 21; and when bag 21 is fully inflated a further pressure switch actuates relays to inflate bag 20 to a predetermined pressure whereat its supply valve is closed and the motor is switched off.

If the switch 55A is operated to its down position the circuitry, via relays and dump valves allows, compressed air from bag 20 to escape to atmosphere via the air system pipes and back feeding through the compressor. This facility allows minor adjustment of the height of the top bag 20 and to provide some comfort to the occupant, but if switch 55A is held down, the bags are allowed to deflate in the sequence 20, 21 then 22, If needed the unit 50 may have an exhaust switch (not shown) so that air may be reverse pumped from the bags.

The circuitry is arranged so that switching off the supply of compressed air will only allow deflation of that bag of the stack which was in the process of being inflated.

The switches 56, 56A control inflation and deflation of the bag 23 independently of the inflation and deflation of the stack via respective pressure supply and dump valves, and a pressure limit switch to halt inflation and hold the bag 23 inflated when a predetermined pressure is reached. To expedite deflation, the optional exhaust switch may be operatively effective for controlling pumping of air from the bag 23, or the switch 56A may control this pumping function instead of actuating a dump valve.

In use, the pipes 59 are connected, in the appropriate order, by the connectors 57 to the respective outlets 52. The connectors 57 preferably include valves which close automatically when the connectors are uncoupled from the outlets, and the connectors and outlets are preferably colour coded.

Referring again to FIGS. 1 to 4. The sequence of steps for lifting a person is preferably:

(a) Ensure that all the bags are deflated and insert the device beneath the person, preferably with the aid of the ramp device (FIG. 1).
(b) Inflate the base lifting bag 23, and remove the ramp device (if fitted). At this stage the castors may be fitted because the platform is elevated sufficiently, but fitting of the castors is preferably postponed until after step (c).
(c) Inflate the stack of bags in sequence (FIG. 2), to lift the person clear of the platform while the lifting device is supported statically and stably by the base lifting bag 23.
(d) Fit the castors to the platform (FIGS. 3 and 3A).
(e) Deflate the bag 23 to retract the bag upwardly to the platform (FIG. 4).

Thereafter, the lifting device may be employed as a trolley (or if elongate as a wheeled stretcher) for moving the person.

In the second embodiment FIGS. 6 to 12, the wheelchair comprises mobile support means, in the form of a wheeled chassis, and the lifting device 10. The wheeled chassis comprises two separate side frame units 11 separable from a mounting arrangement and, optionally, a backrest 12 separable from the frame units.

Figure 8:
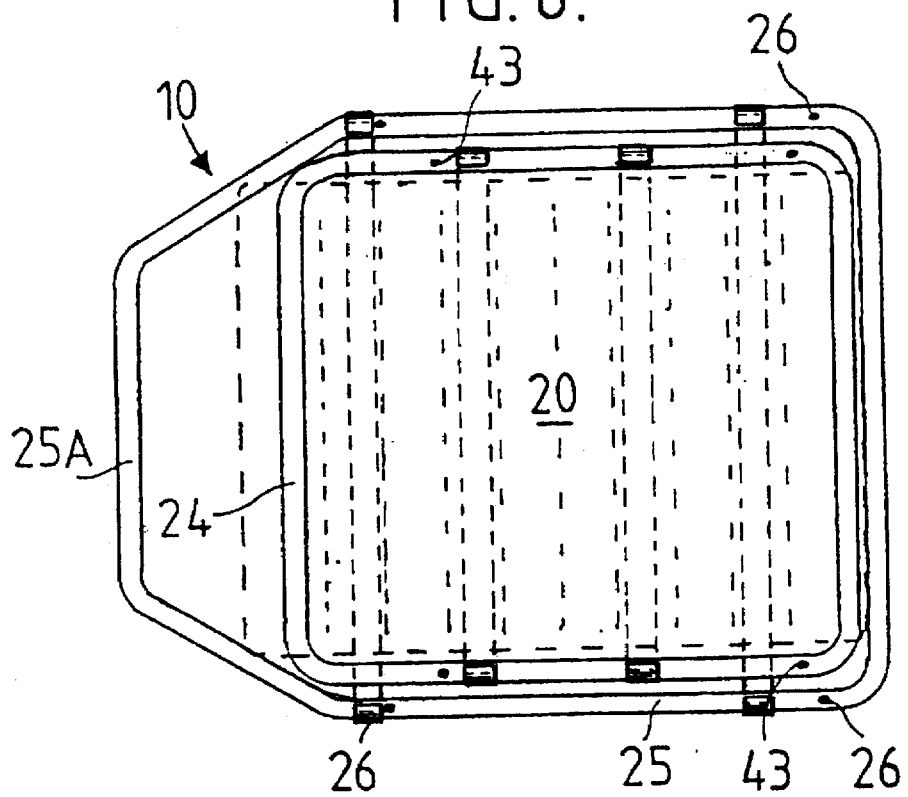
FIG. 8 shows a plan view of a lifting device of the wheelchair.

As shown in FIGS. 7 and 8, lifting device 10 is integrated with base lifting means and comprises a stack of the four substantially rectangular pneumatically inflatable bags 20, 21, 22 and 23. The mounting arrangement comprises an upper mounting 24 and a lower mounting 25 to which the units 11 are attachable as hereinafter described. The upper mounting 24 is formed from a metal tube so as to be substantially rectangular (with rounded corners) and closely surrounds the stack; and the lower mounting is similarly formed from a metal tube so as to be of slightly larger dimensions so that upper mounting 24 can lie within the lower mounting when the bags are deflated. The lower mounting 25 has an extended front portion 25A which, in use, can serve as a footrest.

The upper mounting 24 is secured to the stack at the junction of the top, or cushion, bag 20 and the lifting bag 21 therebelow by means of at least one fabric web (not shown) which is doubled about parts of the tubing of the mounting and is bonded to and extends between the bags 20 end 21. The lower mounting 25 is secured to the stack at the junction of the bottom, or jacking, bag 23 which serves as the base lifting means and the lifting bag 22 thereabove in a similar manner by a bonded-in fabric web or webs (not shown).

Each of the bags 20, 21, 22 and 23 is made from an inelastic flexible impervious material and contains flexible inelastic internal links connected to the upper and lower panels of the bags to limit the separation of the panels when the bags are inflated, so that the bags are shape-stabilized. Each of the bags 20, 21, 22 and 23 has an air inlet 27 in broken lines in FIG. 9 to which the air supply hoses 59 are or can be attached for connecting the bags to the pumped air supply and control unit 50 which is preferably arranged to operate as previously disclosed.

Figure 11:
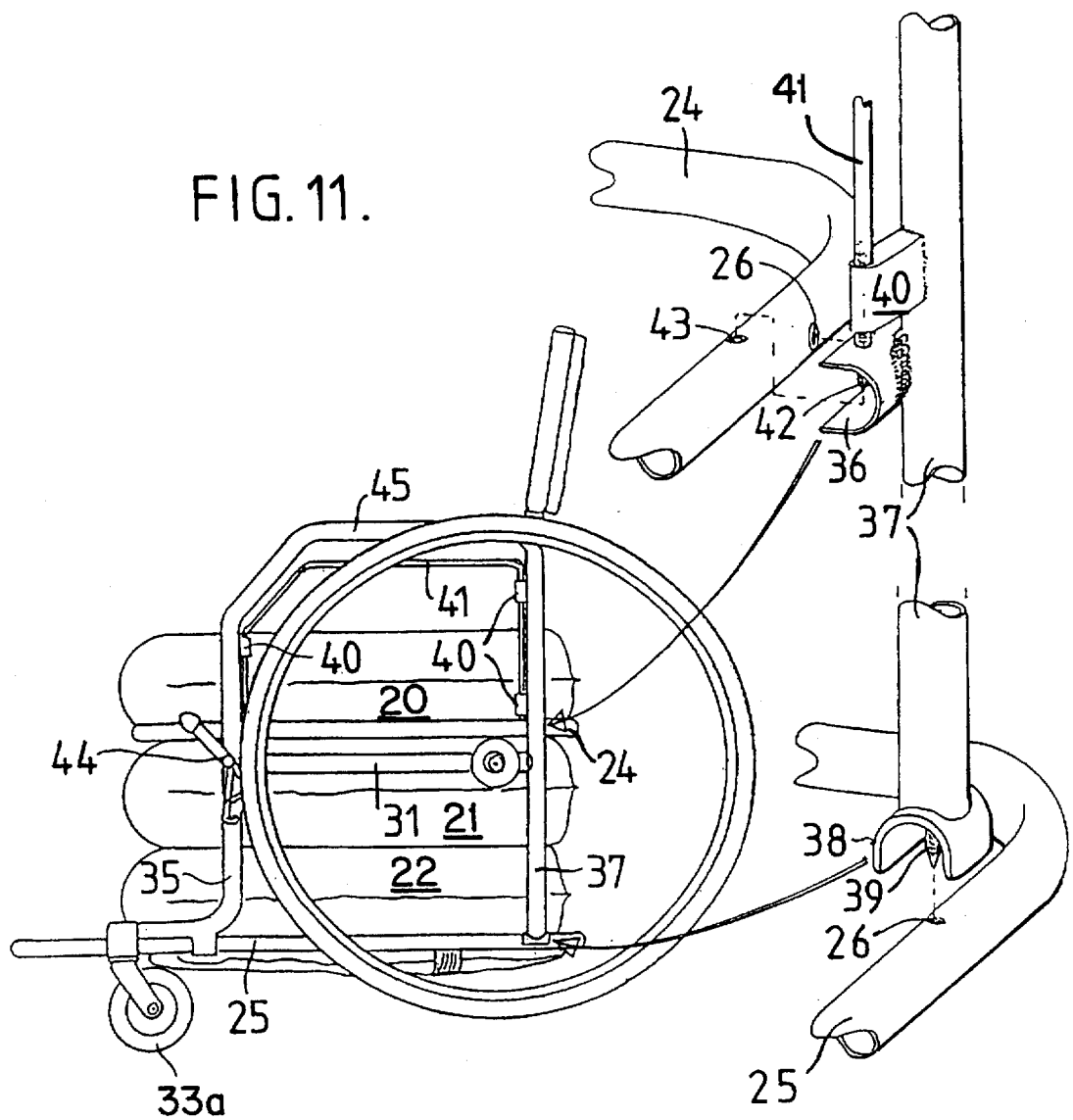
FIG. 11 shows enlarged details of the side frame.

As shown in FIG. 10, each frame unit 11 comprises a tubular metal A-frame 30, a large wheel 32 mounted at the rear end of the crosspiece 31 of the A-frame, a castor wheel 33a mounted on an extension 34 at the lower end of the front limb 35, and upper and lower connector means respectively to engage the upper and lower mountings 24 and 25, shown in more detail in FIG. 11. The upper connector means comprises a laterally open U-shaped bracket 36 welded across the rear limb 37 of the A-frame; a similar bracket welded across the front limb 35, above the crosspiece 31; and the lower connector means comprises a downwardly open inverted U-shaped bracket 38 welded across the bottom of the rear limb 37 and a similar bracket at the bottom of the front limb 35. Within each bracket 36, 38 there is a locating peg 39, and the tubing of the mountings 24 and 25 is apertured to provide locating sockets 26 to receive the pegs 39 when that tubing is received in the brackets 36, 38 as the units 11 are fitted onto the sides of the lifting device. Each of the front and rear limbs carries guides 40 to support an inverted U-shaped latch member 41 on each unit. The end portions 42 of the latch member 41 each extend through an aperture in the upper wall of each bracket 36, and the tubing of the upper support 24 is apertured to provide retaining sockets 43 to receive the end portions 42 (when the tubing is fully inserted into said brackets) to retain the tubing in the brackets and thereby lock the units to the lifting device. The units can be released from the lifting device by raising the members 41, swinging the units apart to disengage from the upper mounting and lifting the units to disengage from the lower mounting.

Each front limb 35 carries a manually operable brake 44 for the respective wheel 32.

The backrest 12 comprises a panel 47, in the form of a web of flexible material, attached at its ends to two tubular rigid uprights 48 which are insertable into sockets 46 on the rear limbs 37 of the A-frames to link the A-frames. If required for mechanical stability, the uprights 48 may be formed integrally with a crossbar (not shown) from a single tube, which crossbar may serve as a handle by which the wheelchair may be propelled by an attendant.

In use, to lift a person sitting or recumbent upon a floor, the lifting device is deflated so that it lies flat substantially within the lower mounting, and is inserted between the person's hips and the floor, preferably rocking the person and gently easing the person onto the device. The bags are then fully inflated in sequence starting with the bottom bag 23. The frame units are then fitted to the mountings and are locked in position lowering the members 41 to engage the portions 42 in the sockets 43. The backrest is then fitted to the frame units. The bottom jacking bag 23 is deflated by exhausting air until the bag retracts upwardly towards the underside of the bag 22, whereby to lower the wheels and 33a onto the ground, and the exhausting of air is continued until the jacking bag 23 lifts clear of the floor and contracts clear of the castor wheels.

The air inlet to the jacking bag 23 is then isolated or closed.

Figure 9:
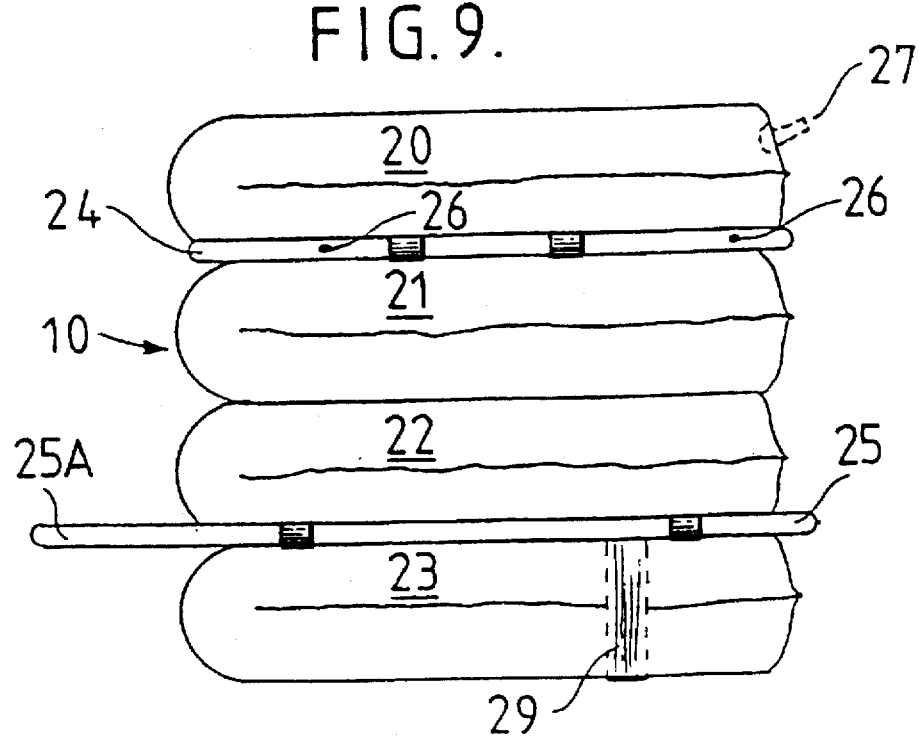
FIG. 9 shows the lifting device in an inflated condition in side elevation.

In order to assist the expulsion of air from the jacking bag 23 and to bias that bag to an upwardly retracted condition, elongate elastic cords or tapes 29 may be attached to the lifting device so as to pass below and support the jacking bag, one of which tapes 29 is indicated in broken lines in FIG. 9.

If the person on the apparatus can grasp the upper portion 45 and remain upright on the device, the apparatus may be used without the backrest to move the person to a nearby location providing a suitable support, e.g. a bed, chair, treatment table, toilet or the like; and for ease of transfer to that support, the jacking bag 23 may be re-inflated, the units 11 removed, and one or more of the bags deflated to adjust the height of the upper surface of the cushion bag 20 to approximately level with or slightly above the surface of the support so that the person can be moved transversely of the lifting device, e.g. can be slid or eased, e.g. backwards or sideways, onto the support.

However, if the person is to be moved any significant distance or if the person cannot easily keep upright, the backrest is preferably fitted to the units, at least during transit to the support.

Figure 13:
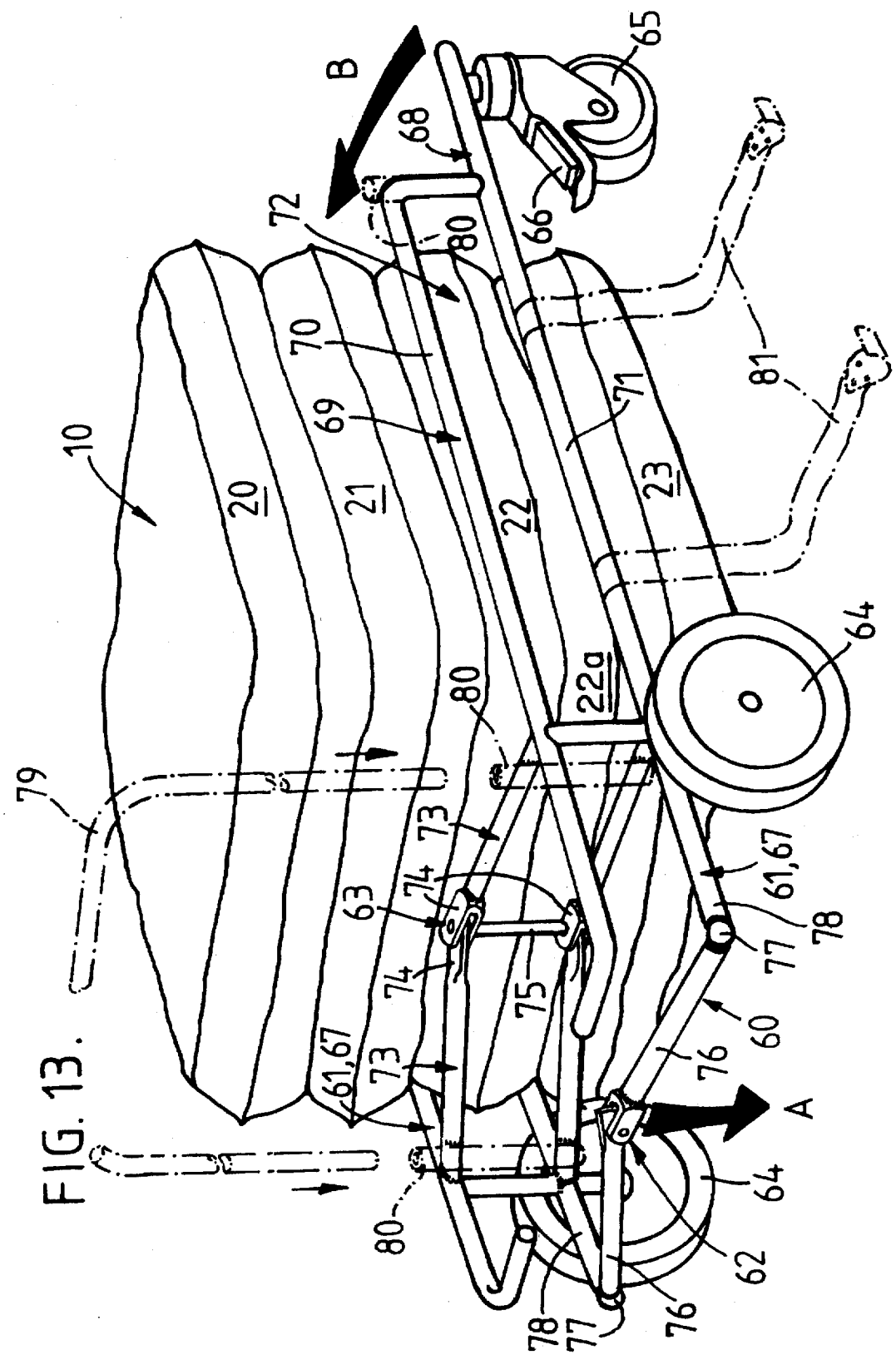
FIG. 13 shows a perspective view of a third embodiment of the apparatus wherein the base lifting means is attached to the lifting device, and the mounting with wheels is wholly removable therefrom.

In the third embodiment (FIG. 13) the four bags 20, 21, 22 and 23 are Secured together to form a single stack and serve as a four bag lifting device 10 with integral base lifting means. The apparatus further includes mobile support means in the form of a trolley 60 which comprises two mirror image clamping frames 61 connected together at and adjacent one end portion 67 by an overcenter lock 62 and a pivotal connection 63, and each frame 61 carries wheel 64 on said one end portion and a castor wheel 65 having a brake 66 at the other end portion 68 so that the whole can serve as a mobile chassis. Said end portions 67 end 68 are connected by a lateral portion 69 comprising an upper member 70 and a lower member 71 with a laterally extending space 73 therebetween, and a connection portion 73 extends transversely from the junction of the portion 67 with the portion 69 to carry parts 74 of the pivotal connection 63. The latter further includes an upright hinge pin 75 pivotally connecting said parts 74.

The over-center look 62 has a pair of transverse arms which are connected by pivots 77 to the ends 78 of the lower members 71 of said end portions 67.

As indicated by arrows A and B, when the lock 62 is moved downwards (A) (from a raised position to a lower locked position) the end portions 68 are moved towards (B) each other (about the axis of the pin 75 which is offset from the position of the lock 62) to decrease the space between the lateral portions 69.

In use, to lift a fallen person from a floor, the lifting device 10 is fully deflated and is inserted beneath the person before the bags are sequentially inflated to raise the person. The trolley 60 is then wheeled up to the device, with the lateral portions 69 splayed apart, and is thrust about the lifting device until the proximal end portion 22a of the bag 22 becomes wedged in the spaces 72 between the members 70 and 71 adjacent to the pivotal connection and in the equivalent spaces in the transverse connection portions 73. The over-center lock 62 is then depressed to its locked position so that the portions 69 are swung forcibly towards each other to ram the upper and lower members 70 and 71 respectively into the junctions between the bags 21 and 22 and between the bags 22 and 23 to clamp the bag 22 into the wheeled chassis. In this condition, the portions 69 serve as a mounting assembly for supporting the device 10. The bag 23 is then deflated fully to retract upwards to the underside of the bag 22.

The trolley 60 is preferably provided with a separable upstanding handle 79 (shown partially) for a raised person to grip or lean back against and/or for a helper to grasp for propelling the apparatus. The handle 79 may be received in alternative sockets 80 indicated in broken lines at or adjacent said end portions 67 and 68.

Retaining means comprising detachable, e.g. hook ended, straps 81 indicated in broken lines, is preferably provided. The straps 81 are elastic up to a limit set by inextensible longitudinal cords, so that if the bag 22 becomes partially deflated it (and the deflated bag 23) can be supported by said straps clear of the floor.

The invention is not confined to details of the foregoing examples, and many variations are possible within the scope of the invention. For example, the bags, or at least one thereof, may be releasably secured in the stack, e.g. by means of fasteners or fastening tape such as "Velcro" (a Registered Trade Mark).

Where the bags are permanently connected, the abutting faces of the panels may be bonded together.

The stack is preferably of modular construction e.g. in which the lowermost bag is the same as the next bag. The inlets may be offset, e.g. to allow an inverted duplicate of the bag 20 to be superimposed on the bag 20 without significantly increasing the deflated thickness.

The switch 55 may be able to be locked in its "on" or "up" position to free the operator to attend the person being lifted.

Instead of being arranged for automatic sequential operation of the bags of the stack, the units 50 and 51 may provide respective switches, circuitry and valves for each bag of the stack for operator control of each bag individually.

In the second embodiment, the apparatus may be in the form of a trolley employing a lifting device dimensioned so that a person can lie on the upper bag which thus serves as a mattress (instead of a seat) the side frame units being appropriately laterally extended and provided at each end with castor wheels, and the backrest being omitted or replaced by a handle (or handles at opposite ends of the trolley).

The various parts and features of the embodiments may be employed in any suitable combination. For example, the base 15 of the first embodiment may be employed in the third embodiment, the space 72 being sufficient to allow the lower member 71 to lie engaged below the base 15. The flanges 16 may be removed.

The invention further includes and provides a lifting apparatus having any novel part or feature or novel combination of the parts or features disclosed herein or in the accompanying drawings.

I claim:

1. Mobile medical apparatus for lifting a disabled person in a confined space, said apparatus comprising:

a) means for mounting a lifting device on mobile support means b) the lifting device having a plan area and including a stack of inflatable bags secured together, in which the fully inflated thickness of each bag is less than the width and breadth of each bag, at least one of the bags below the uppermost bag of the stack containing internal flexible links to limit the inflated thickness thereof;

c) the mobile support means including wheel means disposed on the mobile support means outside the plan area of the lifting device;

d) at least a portion of the mobile support means being removable from the lifting device to permit clear access to the lifting device when the latter is deflated; and e) said lifting device further including an inflatable base lifting bag means to support the lifting device while said removable support means is refitted, f) said base lifting bag means being deflatable to rise clear above a bottom level of the wheel means.

2. Mobile apparatus as claimed in claim 1 wherein the mobile support means comprises base means fixed between the lifting device and the base lifting means, and the wheel means comprises castors removably attached to said base means.

3. Mobile apparatus as claimed in claim 2 wherein each said inflatable bag means including a valve, said lifting device including pneumatic control means including a plurality of pressure actuated switching arrangements, arranged so that each valve is connected to a respective one of the switching arrangements so that each said valve is closed by the switching arrangement when the pressure at that output reaches a predetermined pressure, and said switching arrangements are electrically connected to open the valves sequentially to a pneumatic pressure supply line, for automatically inflating the bags sequentially.

4. Mobile apparatus as claimed in claim 1 wherein the mobile support means including trolley means having the wheel means and two clamping frames operatively connected to releasably clamp at least one inflated bag of the stack therebetween.

5. Mobile support apparatus as claimed in claim 4 wherein the base lifting bag means is operable to elevate a lowermost bag to a position between said clamping frames.

6. Mobile support apparatus as claimed in claim 1 wherein the mobile support means including a wheeled chassis comprising a mounting arrangement connected to said lifting device, and two side frames which are releasably connected to said mounting arrangement, said wheel means being attached to said side frames.

7. Medical lifting apparatus for lifting a disabled person in a confined space, said apparatus comprising:

a) wheel means located on platform means for supporting said lifting device;

b) said lifting device including a stack of inflatable bags secured together, in which stack the fully inflated thickness of each bag is less than the width and breadth of each bag, c) at least one bag below an uppermost bag of the stack contains internal flexible links to limit the inflated thickness of said bag;

d) said lifting device including a lowermost jacking bag actuable to raise the wheel means off the ground so that at least the wheel means can be removed to lower the platform means to very close to the ground to minimize the effort required to move a fallen person onto the lifting device.

8. Apparatus as claimed in claim 7 wherein said lifting device including separable electro-pneumatic control means, said control means including a plurality of solenoid actuated flow control valves and a hand control unit for remote electrical actuation of the valves to control the flow of compressed air from a compressor to the bags in said stack via the valves and to control the release of air from the bags, said control means enables air to be pumped from said lowermost jacking bag to cause the lacking bag to retract upwardly to the underside of the stack.

9. Apparatus as claimed in claim 7 wherein the lowermost bag of the stack has a thickness greater than the inflated thickness of the uppermost bag;

the links are webs of flexible material extending between and bonded to upper and lower panels of the bags;

the stack including at least three bags with adjacent bags in the stack secured together by webs which extend along at least two sides thereof and are bonded to side walls of the bags;

each of the bags have air inlets arranged on one side of the stack, and the overall plan dimensions of the stack are at least 0.3 meters by 0.3 meters up to 0.8 meters by 2.0 meters; and the fully inflated height of each bag is less than half of its smallest plan dimension.

10. Medical lifting apparatus for disposition on a floor to lift a person, said apparatus comprising:

a) a lifting device including a stack of inflatable bags secured together, in which the fully inflated thickness of each said bag is less than the width and breadth of each bag, b) at least one of the bags containing internal flexible links to limit the inflated thickness thereof;

c) the stack including a lowermost bag mounted on rigid base means including detachable wheel means, and d) base lifting means for raising said rigid base means to a height sufficient to enable the wheel means to be lifted off the floor on which the lifting device is disposed.

11. Apparatus as claimed in claim 10 wherein said wheel means include castors, the rigid base means includes flanged lateral portions from which the castors can be removed by being moved longitudinally of said flanged lateral portions;

the rigid base means is releasably attached to a ramp panel which provides a ramp to facilitate the base lifting means being inserted beneath a person.

12. Mobile medical lifting apparatus for lifting a disabled person in a confined space, said apparatus comprising:

a) base jacking bag means and lifting means supported on a frame for lifting a person b) said lifting means including a stack of inflatable bags secured together and each bag having a fully inflated thickness less than the width and breadth of each bag, c) at least one of the bags of the stack containing internal flexible links to limit the inflated thickness thereof;

d) the frame including two lateral frame units on which wheel means are mounted, said frame units being individually separable from said lifting means;

e) said base jacking bag means being located below said stack;

f) mounting arrangement means being releasably attached to said lateral frame units, g) said base jacking bag means being inflatable to raise the lifting means sufficiently above the ground to allow the lateral frame units to be attached to and detached from the mounting arrangements.

13. Apparatus as claimed in claim 12 wherein the two frame units are connected at the rear of the lifting means by a separable bridging means serving as a handle.

14. Apparatus as claimed in claim 12 wherein the mounting arrangement means includes a lower mounting at the junction of the base jacking bag means with the next above bag of said stack, and an upper mounting at the junction of an uppermost bag of the stack with the bag immediately therebelow, and each frame unit includes upper and lower connector means to engage the upper and lower mountings.

15. Apparatus as claimed in claim 12 wherein said mounting arrangement means including a rigid peripheral frame and web means extending across the frame and between bags in said apparatus; and the frames include plan areas which allow one of the mountings to be disposed between the other and the stack when the bags are deflated.

16. Apparatus as claimed in claim 12 wherein each of said frame units provides an armrest side rail for the apparatus.

17. Medical lifting apparatus for lifting a disabled person in a confined space, said apparatus comprising:

a) a stack of inflatable bags secured together with each said bag having a fully inflated thickness less than the width and breadth of each bag, b) at least one of the bags below an uppermost bag of the stack containing internal flexible links to limit the inflated thickness thereof;

c) mounting arrangement means releasably engageable with said stack when the bags are inflated, d) wheel means on said mounting arrangement means, and e) base jacking bag means disposed below said stack and actuable firstly to raise said stack to a height to enable said mounting arrangement means to be engaged with the stack and secondly to retract said base jacking bag means upwardly clear of the floor on which the wheel means rests.

18. Apparatus as claimed in claim 17 wherein the mounting arrangement means including two clamping frames operatively connected to releasably clamp an inflated lowermost bag of the stack therebetween.

19. Apparatus as claimed in claim 18 wherein said clamping frames are pivotally connected, and with overcenter locking means secure said clamping frames in a position to clamp the stack of bags therebetween.

20. A wheelchair for transporting a person, said wheelchair comprising:

a) wheeled chassis means and a seat lifting means including a stack of inflatable bags, b) said wheeled chassis including rigid upper and lower mountings attached to said stack, and c) two lateral frame units individually and separably attached to said upper and lower mountings;

d) said stack including a lowermost bag which is deflatable to lower said wheeled chassis onto the ground.

* * * * *